United States Patent
Liao et al.

(10) Patent No.: US 10,073,613 B2
(45) Date of Patent: Sep. 11, 2018

(54) PROCESSING METHOD AND APPARATUS, AND TERMINAL

(71) Applicant: Huawei Technologies Co., Ltd., Shenzhen, Guangdong (CN)

(72) Inventors: Zhiqing Liao, Shenzhen (CN); Shan Zhong, Shenzhen (CN); Zhaojie Xia, Shenzhen (CN); Lifu Xu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 174 days.

(21) Appl. No.: 15/101,321

(22) PCT Filed: Dec. 3, 2013

(86) PCT No.: PCT/CN2013/088458
§ 371 (c)(1),
(2) Date: Jun. 2, 2016

(87) PCT Pub. No.: WO2015/081503
PCT Pub. Date: Jun. 11, 2015

(65) Prior Publication Data
US 2016/0306518 A1 Oct. 20, 2016

(51) Int. Cl.
*G06F 3/041* (2006.01)
*G06F 3/0488* (2013.01)
(Continued)

(52) U.S. Cl.
CPC ........ *G06F 3/0488* (2013.01); *G06F 3/04892* (2013.01); *H04M 1/72519* (2013.01); *H04M 2250/22* (2013.01)

(58) Field of Classification Search
CPC .. G06F 3/0488; G06F 3/04886; G06F 3/0489; G06F 3/04892
See application file for complete search history.

(56) References Cited

U.S. PATENT DOCUMENTS 8,046,685 B2 * 10/2011 Kishi .................. G06F 3/04886
345/173
8,347,220 B2 * 1/2013 Kikuoka ............... G06F 3/0488
715/764
(Continued)

FOREIGN PATENT DOCUMENTS

CN 101382868 A 3/2009
CN 102681779 A 9/2012
(Continued)

*Primary Examiner* — Vijay Shankar (57) ABSTRACT

The present invention is applicable to the field of terminal technologies, and provides a processing method and apparatus, and a terminal. The method includes: acquiring a sensing position on a sensitive screen of a screen; acquiring, according to the acquired sensing position on the sensitive screen and a preset correspondence between a sensing position on the sensitive screen and a display position on the screen, a display position, corresponding to the acquired sensing position on the sensitive screen, on the screen; displaying, when the display position is located in an operable area displayed on the screen, a touch button at the sensing position, corresponding to the operable area displayed on the screen, on the sensitive screen; and receiving an operation instruction for the touch button, where the operation instruction is used to instruct to perform an operation on the operable area.

22 Claims, 6 Drawing Sheets

(51) Int. Cl.
*H04M 1/725* (2006.01)
*G06F 3/0489* (2013.01)

(56) References Cited

U.S. PATENT DOCUMENTS

| | | | |
|---|---|---|---|
| 9,244,544 B2 * | 1/2016 | Matsuki | G06F 3/0485 |
| 9,542,097 B2 * | 1/2017 | Ganey | G06F 1/1626 |
| 2009/0070670 A1 | 3/2009 | Kishi | |
| 2011/0169749 A1 | 7/2011 | Ganey et al. | |
| 2012/0218307 A1 | 8/2012 | Lin et al. | |
| 2014/0160073 A1 | 6/2014 | Matsuki | |

FOREIGN PATENT DOCUMENTS

| | | | |
|---|---|---|---|
| CN | 102880399 A | 1/2013 | |
| CN | 102915201 A | 2/2013 | |
| CN | 102945136 A | 2/2013 | |
| CN | 103024156 A | 4/2013 | |
| EP | 2557492 A1 | 2/2013 | |
| TW | 201235904 A | 9/2012 | |
| WO | 2012077273 A1 | 6/2012 | |
| WO | 2013018480 A1 | 2/2013 | |

* cited by examiner

PROCESSING METHOD AND APPARATUS, AND TERMINAL

CROSS REFERENCE TO RELATED APPLICATIONS

The present application claims priority under 35 U.S.C. § 365 to International Patent Application No. PCT/CN2013/088458 filed Dec. 3, 2013 which is incorporated herein by reference into the present disclosure as if fully set forth herein.

TECHNICAL FIELD

The present invention relates to the field of terminal technologies, and in particular, to a processing method and apparatus, and a terminal.

BACKGROUND

With the rapid development of intelligent technologies of touch screen terminals such as mobile terminals, in mainstream intelligent mobile terminals on the market, an input manner using a physical keyboard is gradually discarded, and an input and output manner using a screen with a multi-touch capability is used. A larger screen of an intelligent mobile terminal may present more content and details, where a font size is also larger, and therefore, eyes feel more comfortable when looking.

However, when a user holds a mobile terminal with a single hand, a screen range on which an operation can be performed by using the single hand is limited. When a screen is relatively large, and a single-hand operation manner is used, a partial area is out of a touch range that can be reached by fingers. In this case, the user cannot perform an operation on content on a full screen. For example, when a size of the screen exceeds five inches, the user cannot touch the upper left and the upper right of the screen with a single hand. However, in interface design of a mobile terminal, many functions and much content need to be implemented by performing an operation on an upper part of a screen. In this case, operations can be completed only with the other hand for a screen area out of a touch range on which an operation can be performed; therefore, operations are complex, and operation efficiency of the user is affected.

SUMMARY

An objective of the present invention is to provide a processing method and apparatus, and a terminal, so as to resolve an existing problem that an operation is complex and operation efficiency of a user is affected because when the user performs an operation on a screen of a touch screen terminal with a single hand, the user cannot manipulate content on a full screen, and needs to use the other hand to complete the operation.

According to a first aspect, the present invention provides a processing method, where the method includes:

acquiring a sensing position on a sensitive screen of a screen;

acquiring, according to the acquired sensing position on the sensitive screen and a preset correspondence between a sensing position on the sensitive screen and a display position on the screen, a display position, corresponding to the acquired sensing position on the sensitive screen, on the screen;

displaying, when the display position is located in an operable area displayed on the screen, a touch button at the sensing position, corresponding to the operable area displayed on the screen, on the sensitive screen; and receiving an operation instruction for the touch button, where the operation instruction is used to instruct to perform an operation on the operable area.

With reference to the first aspect, in a first possible implementation manner of the first aspect, after the acquiring a display position, corresponding to the acquired sensing position on the sensitive screen, on the screen, the method further includes:

displaying a cursor at the display position, where the displaying, when the display position is located in an operable area displayed on the screen, a touch button at the sensing position, corresponding to the operable area displayed on the screen, on the sensitive screen is specifically:

when the cursor is located in the operable area displayed on the screen, displaying the touch button at the sensing position, corresponding to the operable area displayed on the screen, on the sensitive screen.

With reference to the first aspect, in a second possible implementation manner of the first aspect, the preset correspondence between a sensing position on the sensitive screen and a display position on the screen is specifically: a length-width ratio of the sensitive screen is the same as a length-width ratio of the screen, and/or a relative position of the sensing position with respect to a boundary of the sensitive screen is the same as a relative position of the display position with respect to a boundary of the screen.

With reference to the first aspect, in a third possible implementation manner of the first aspect, before the acquiring a sensing position on a sensitive screen of a screen, the method further includes: presetting a position relationship between the sensitive screen and the screen.

With reference to the first aspect, in a fourth possible implementation manner of the first aspect, before the acquiring a sensing position on a sensitive screen of a screen, the method further includes: turning on the sensitive screen, where the turning on the sensitive screen is specifically: turning on the sensitive screen by using a preset physical button; or the turning on the sensitive screen specifically includes:

detecting, by using the sensitive screen of the screen, a gesture made to the sensitive screen;

performing matching according to the gesture, to obtain an operation command that corresponds to the gesture; and turning on the sensitive screen when the operation instruction is an instruction for turning on the sensitive screen.

With reference to the first aspect, in a fifth possible implementation manner of the first aspect, the method further includes: turning off the sensitive screen, where the turning off the sensitive screen is specifically: turning off the sensitive screen by using a preset physical button; or the turning off the sensitive screen specifically includes:

detecting, by using the sensitive screen of the screen, a gesture made to the sensitive screen;

performing matching according to the gesture, to obtain an operation command that corresponds to the gesture; and turning off the sensitive screen when the operation instruction is an instruction for turning off the sensitive screen.

With reference to the first aspect, in a sixth possible implementation manner of the first aspect, the method further includes:

receiving a sliding operation performed on a scroll bar by a user, where the scroll bar is a vertical and/or horizontal scroll bar displayed at an edge of the sensitive screen; and performing a sliding and browsing operation on content on the screen according to the sliding operation.

According to a second aspect, the present invention provides a processing apparatus, where the apparatus includes:

a first acquiring module, configured to acquire a sensing position on a sensitive screen of a screen;

a second acquiring module, configured to acquire, according to the acquired sensing position on the sensitive screen and a preset correspondence between a sensing position on the sensitive screen and a display position on the screen, a display position, corresponding to the acquired sensing position on the sensitive screen, on the screen;

a first display module, configured to display, when the display position is located in an operable area displayed on the screen, a touch button at the sensing position, corresponding to the operable area displayed on the screen, on the sensitive screen; and a first receiving module, configured to receive an operation instruction for the touch button, where the operation instruction is used to instruct to perform an operation on the operable area.

With reference to the second aspect, in a first possible implementation manner of the second aspect, the apparatus further includes:

a second display module, configured to display a cursor at the display position, where the first display module is specifically configured to: when the cursor is located in the operable area displayed on the screen, display the touch button at the sensing position, corresponding to the operable area displayed on the screen, on the sensitive screen.

With reference to the second aspect, in a second possible implementation manner of the second aspect, the preset correspondence between a sensing position on the sensitive screen and a display position on the screen is specifically: a length-width ratio of the sensitive screen is the same as a length-width ratio of the screen, and/or a relative position of the sensing position with respect to a boundary of the sensitive screen is the same as a relative position of the display position with respect to a boundary of the screen.

With reference to the second aspect, in a third possible implementation manner of the second aspect, the apparatus further includes:

a presetting module, configured to preset a position relationship between the sensitive screen and the screen.

With reference to the second aspect, in a fourth possible implementation manner of the second aspect, the apparatus further includes:

a turn-on module, configured to turn on the sensitive screen, where the turn-on module is specifically configured to turn on the sensitive screen by using a preset physical button; or the turn-on module specifically includes:

a first detection module, configured to detect, by using the sensitive screen of the screen, a gesture made to the sensitive screen;

a first matching module, configured to perform matching according to the gesture, to obtain an operation command that corresponds to the gesture; and a turn-on submodule, configured to turn on the sensitive screen when the operation instruction is an instruction for turning on the sensitive screen.

With reference to the second aspect, in a fifth possible implementation manner of the second aspect, the apparatus further includes:

a turn-off module, configured to turnoff the sensitive screen, where the turn-off module is specifically configured to turn off the sensitive screen by using a preset physical button; or the turn-off module specifically includes:

a second detection module, configured to detect, by using the sensitive screen of the screen, a gesture made to the sensitive screen;

a second matching module, configured to perform matching according to the gesture, to obtain an operation command that corresponds to the gesture; and a turn-off submodule, configured to turn off the sensitive screen when the operation instruction is an instruction for turning off the sensitive screen.

With reference to the second aspect, in a sixth possible implementation manner of the second aspect, the apparatus further includes:

a second receiving module, configured to receive a sliding operation performed on a scroll bar by a user, where the scroll bar is a vertical and/or horizontal scroll bar displayed at an edge of the sensitive screen; and an operation module, configured to perform a sliding and browsing operation on content on the screen according to the sliding operation.

According to a third aspect, the present invention provides a terminal including the foregoing processing apparatus.

According to a fourth aspect, the present invention provides a terminal, where the terminal includes a processor, a screen, a memory, and a bus, and the processor, the screen, and the memory are coupled together by using the bus, where the processor controls an operation of the terminal, to implement the foregoing method, where steps of the method are implemented by using an integrated logic circuit of hardware in the processor or an instruction in a software form;

the screen is a screen having an input function and an output and display function, and the screen includes a sensitive screen; and the memory stores software executed by the processor, and provides an instruction and data to the processor.

In the present invention, a sensing position on a sensitive screen of a screen is acquired; when a display position, corresponding to the acquired sensing position on the sensitive screen, on the screen is located in an operable area displayed on the screen, a touch button is displayed at the sensing position, corresponding to the operable area displayed on the screen, on the sensitive screen; and an operation is performed on the operable area by using an operation instruction for the touch button. Therefore, an operation can be performed with a single hand on content on a full screen of a terminal, which is easy to operate, and improves operation efficiency of a user. In addition, a fixed function menu is not required on a sensitive screen, thereby reducing an area of the sensitive screen.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and beneficial effects of the present invention clearer and more comprehensible, the following further describes the present invention in detail with reference to the accompanying drawings and embodiments. It should be understood that the specific embodiments described herein are merely used to explain the present invention but are not intended to limit the present invention.

To describe the technical solutions of the present invention, the following provides a description by using specific embodiments.

Figure 1:
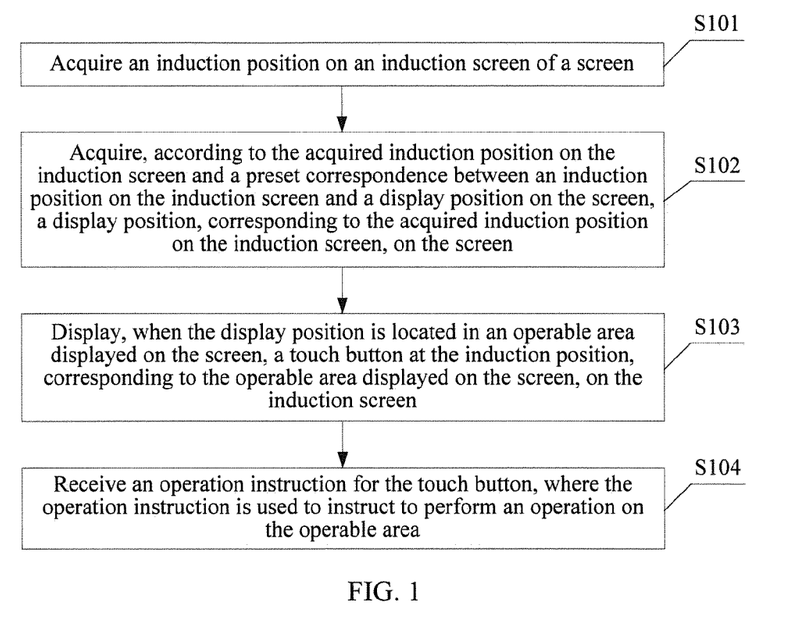
FIG. 1 is a flowchart of a processing method according to an embodiment of the present invention.

Referring to FIG. 1, a processing method provided by an embodiment of the present invention includes the following steps:

S101: Acquire a sensing position on a sensitive screen of a screen.

In another embodiment of the present invention, before S101, the method may further include: presetting a position relationship between the sensitive screen and the screen.

The sensitive screen is a partial area of the screen and the sensitive screen is a central touch area of a terminal. A size of the sensitive screen may be set by a designer to a fixed value, or may be freely adjusted by a user; the sensitive screen may also be set by a designer to a fixed position, or a position may be freely adjusted by the user. For example, the sensitive screen may be located on the lower left or the lower right of the screen, or in a middle part of the screen. The sensitive screen is displayed in a transparent state. The sensing position on the sensitive screen may be a position, on the sensitive screen, touched by the user and induced by the sensitive screen, or may be a position sensed on the sensitive screen corresponding to a gesture made by the user without touching the sensitive screen.

S102: Acquire, according to the acquired sensing position on the sensitive screen and a preset correspondence between a sensing position on the sensitive screen and a display position on the screen, a display position, corresponding to the acquired sensing position on the sensitive screen, on the screen.

In another embodiment of the present invention, after S102, the method may further include:

displaying a cursor at the display position.

In another embodiment of the present invention, the preset correspondence between a sensing position on the sensitive screen and a display position on the screen may be specifically: a length-width ratio of the sensitive screen is the same as a length-width ratio of the screen, and/or a relative position of the sensing position with respect to a boundary of the sensitive screen is the same as a relative position of the display position with respect to a boundary of the screen.

Figure 2:
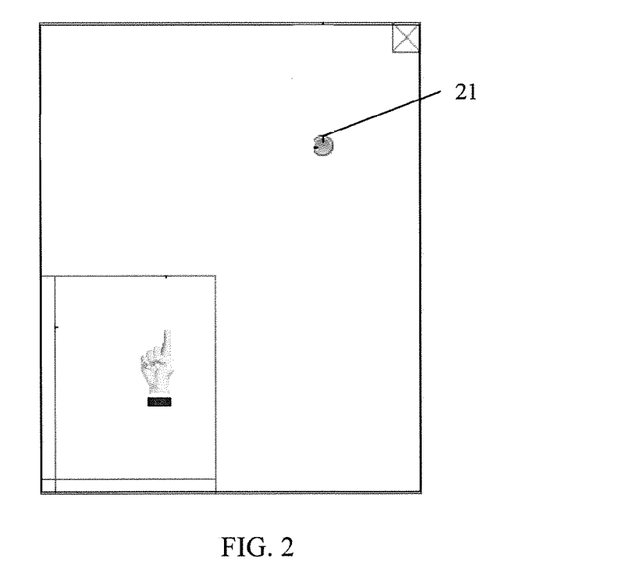
FIG. 2 is a schematic diagram of a display interface of a terminal, when a cursor is located in an inoperable area of a screen, in a processing method according to an embodiment of the present invention.

For example, as shown in FIG. 2, in another embodiment of the present invention, the sensitive screen is rectangular-shaped. By using borders of the screen as boundaries, a length-width ratio of the sensitive screen is the same as a length-width ratio of the screen. When a finger of a user touches the sensitive screen, a cursor 21 appears on the screen, and there is a one-to-one correspondence between a position at which the cursor appears on the screen and a position at which the finger of the user touches the sensitive screen. For example, when the user touches the center of the sensitive screen, the cursor appears in the center of the screen. When the cursor is located in an inoperable area of the screen, a form of the cursor is shown as the cursor 21 in FIG. 2.

In another embodiment of the present invention, the inoperable area refers to all areas on which an operation cannot be performed, such as an area that has no button, link, shortcut, or input box.

In another embodiment of the present invention, when the cursor is located in the inoperable area of the screen, if the sensitive screen receives no new input operation or instruction within a period of time, the cursor disappears; or when the cursor is located in the operable area of the screen, even if the sensitive screen receives no new input operation or instruction within a period of time, the cursor does not automatically disappear. Therefore, a situation in which the cursor located in the inoperable area of the screen is presented on the screen for a long time is avoided, and a situation in which disappearance of the cursor located in the operable area of the screen causes that the user cannot conveniently determine whether the cursor is located in the operable area is also avoided.

S103: Display, when the display position is located in an operable area displayed on the screen, a touch button at the sensing position, corresponding to the operable area displayed on the screen, on the sensitive screen.

In another embodiment of the present invention, S103 may be specifically:

when the cursor is located in the operable area displayed on the screen, displaying the touch button at the sensing position, corresponding to the operable area displayed on the screen, on the sensitive screen.

Figure 3:
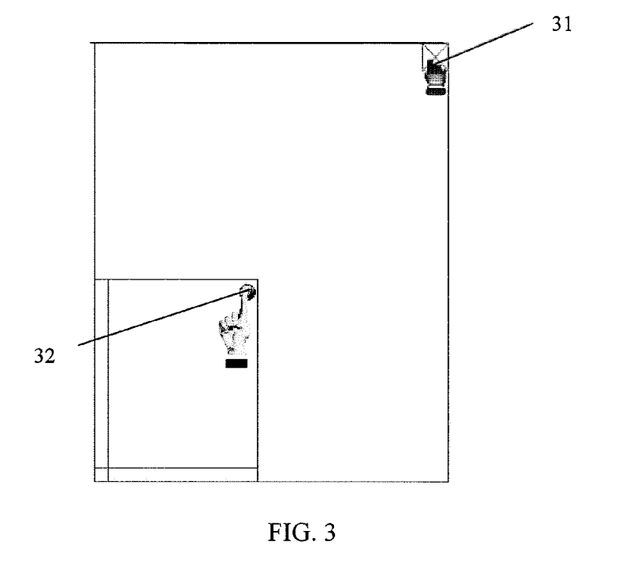
FIG. 3 is a schematic diagram of a display interface of a terminal, when a cursor is located in an operable area of a screen, in a processing method according to an embodiment of the present invention.

In another embodiment of the present invention, when the cursor is located in the operable area of the screen, a form of the cursor may be shown as a cursor 31 in FIG. 3, and a touch button 32 is displayed at a touch position, corresponding to the cursor, on the sensitive screen.

In another embodiment of the present invention, the operable area refers to all areas on which an operation can be performed, such as an area that has a button, a link, a shortcut, or an input box.

S104: Receive an operation instruction for the touch button, where the operation instruction is used to instruct to perform an operation on the operable area.

Figure 4:
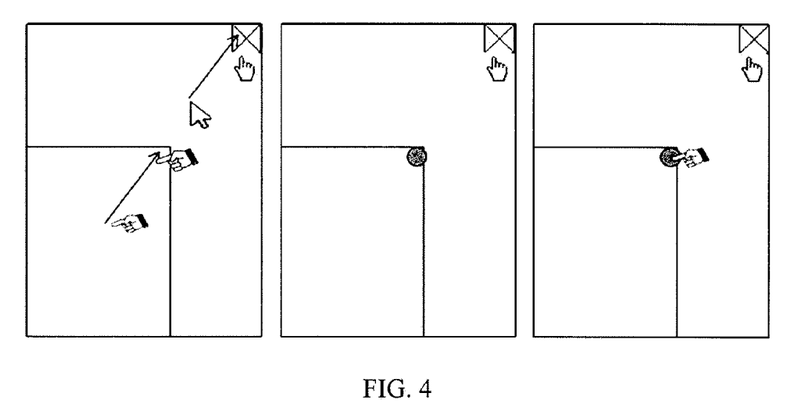
FIG. 4 is a schematic diagram of an operation process of a processing method according to an embodiment of the present invention.

As shown in FIG. 4, an operation process of a processing method provided by an embodiment of the present invention is as follows:

An input track continuously slides on a sensitive screen, and correspondingly, a cursor continuously moves to corresponding positions on a screen. When the cursor moves into an operable area, a touch button is displayed at a touch position, corresponding to the cursor, on the sensitive screen. A user needs to first stop touching the sensitive screen, and then manipulate the touch button. In this case, an operation performed on the touch button is equivalent to an operation directly performed by the user on the operable area on the screen, where the operation includes at least one of a single-tap operation, a double-tap operation, a touch and hold operation, and dragging after touch and hold.

Another embodiment of the present invention further provides a processing method, where a difference between the method and the processing methods in the foregoing embodiments lies in that, before S101 in the processing methods in the foregoing embodiments, the method further includes the following step: turning on the sensitive screen.

In another embodiment of the present invention, the sensitive screen may be turned on by using a preset physical button, where the physical button may be located on a side border or at the bottom or top of a terminal.

Figure 5:
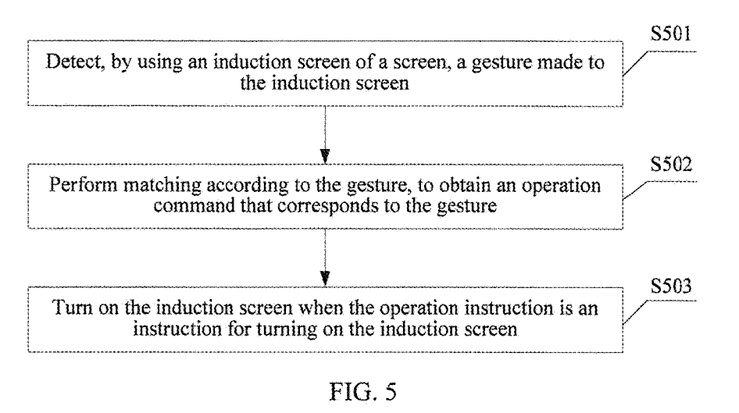
FIG. 5 is a flowchart of turning on a sensitive screen in a processing method according to an embodiment of the present invention.

In another embodiment of the present invention, referring to FIG. 5, the turning on the sensitive screen may also specifically include the following steps:

S501: Detect, by using the sensitive screen of the screen, a gesture made to the sensitive screen.

S502: Perform matching according to the gesture, to obtain an operation command that corresponds to the gesture.

S503: Turn on the sensitive screen when the operation instruction is an instruction for turning on the sensitive screen.

Figure 6:
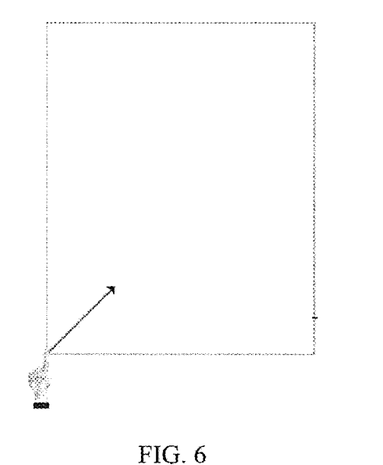
FIG. 6 is a schematic diagram of a gesture for turning on a sensitive screen in a processing method according to an embodiment of the present invention.

In another embodiment of the present invention, the gesture may be preset. The gesture made to the sensitive screen may be a gesture made by a user by touching the sensitive screen and induced by the sensitive screen, or may be a gesture that is made by a user to the sensitive screen without touching the sensitive screen and that is induced by the sensitive screen. For example, the gesture may be set as a sliding gesture that uses any angle of the sensitive screen as a start angle and uses the start angle as a start point. As shown in FIG. 6, using that the sensitive screen is on the lower left of the screen as an example, a sliding gesture that uses a lower left corner of the sensitive screen, that is, a lower left corner of the screen as the start angle may be set as a gesture for turning on the sensitive screen.

In another embodiment of the present invention, the processing method further includes the following step: turning off the sensitive screen.

In another embodiment of the present invention, the sensitive screen may be turned off by using a preset physical button, where the physical button may be located on a side border or at the bottom or top of a terminal.

Figure 7:
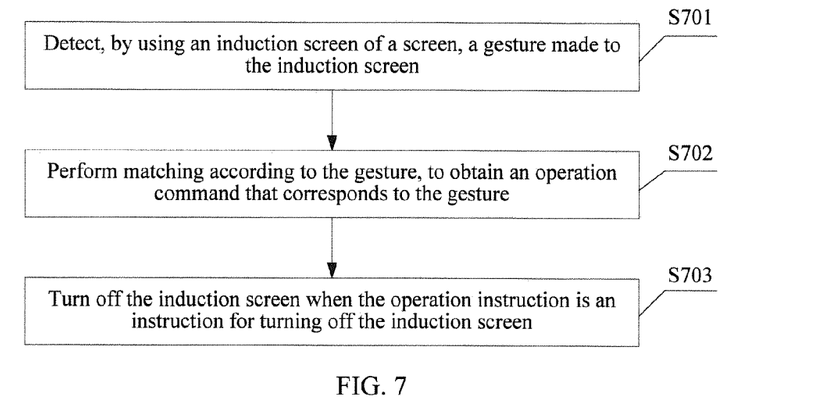
FIG. 7 is a flowchart of turning off a sensitive screen in a processing method according to an embodiment of the present invention.

In another embodiment of the present invention, referring to FIG. 7, the turning off the sensitive screen may also specifically include the following steps:

S701: Detect, by using the sensitive screen of the screen, a gesture made to the sensitive screen.

S702: Perform matching according to the gesture, to obtain an operation command that corresponds to the gesture.

S703: Turn off the sensitive screen when the operation instruction is an instruction for turning off the sensitive screen.

Figure 8:
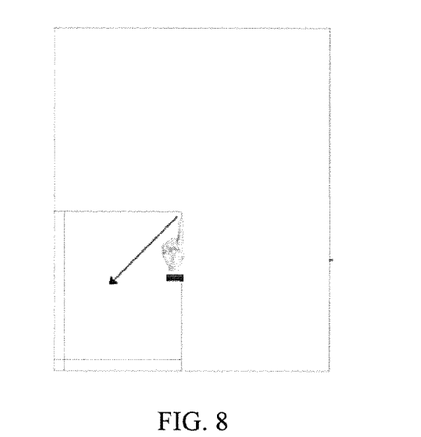
FIG. 8 is a schematic diagram of a gesture for turning off a sensitive screen in a processing method according to an embodiment of the present invention.

In another embodiment of the present invention, the gesture may be preset. The gesture made to the sensitive screen may be a gesture made by a user by touching the sensitive screen and induced by the sensitive screen, or may be a gesture that is made by a user to the sensitive screen without touching the sensitive screen and that is induced by the sensitive screen. For example, the gesture may be set as a sliding gesture that uses a centrosymmetric angle of a start angle of the sensitive screen as a start point. As shown in FIG. 8 using that the sensitive screen is on the lower left of the screen as an example, a sliding gesture that uses an upper right corner of the sensitive screen as the start point may be set as a gesture for turning off the sensitive screen.

Figure 9:
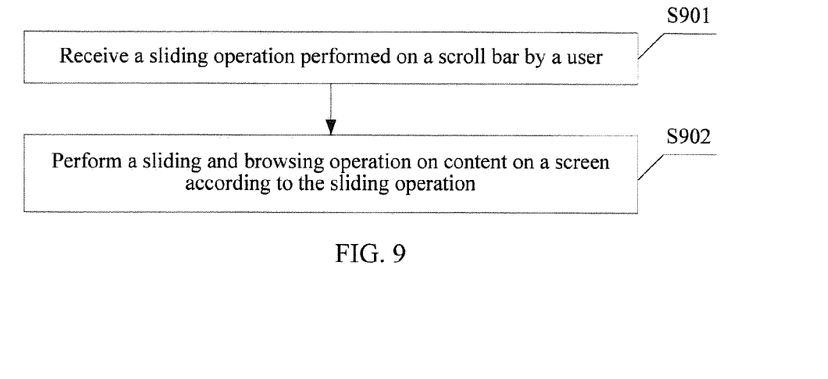
FIG. 9 is a flowchart of displaying and operating a scroll bar in a processing method according to an embodiment of the present invention.

Another embodiment of the present invention further provides a processing method. Referring to FIG. 9, a difference between the method and the processing methods in the foregoing embodiments lies in that, the processing method provide by the another embodiment of the present invention further includes the following steps:

S901: Receive a sliding operation performed on a scroll bar by a user, where the scroll bar is a vertical and/or horizontal scroll bar displayed at an edge of the sensitive screen.

Figure 10:
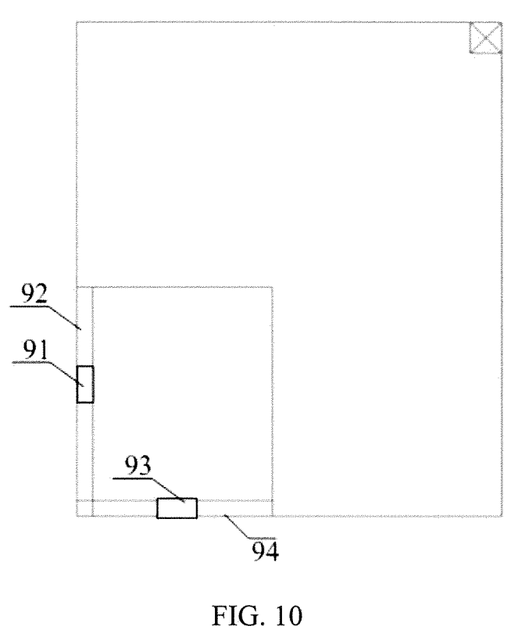
FIG. 10 is a schematic diagram of a scroll bar in a processing method according to an embodiment of the present invention.

In another embodiment of the present invention, the vertical scroll bar includes a scroll block 91 and a scroll box 92, and the horizontal scroll bar includes a scroll block 93 and a scroll box 94. As shown in FIG. 10, a length of the scroll block indicates a position and a proportion of content on a current page of the screen in entire content. For example, when the length of the scroll block is only ⅕ of that of the entire scroll box and the scroll block is located in the middle part, it indicates that there are five screens of content in total, and that the content on the current page is located in the middle part of the entire content. The length of the scroll block is automatically adjusted according to content refreshing.

For example, the scroll bar may be located on a right side and a lower side of the sensitive screen. When a user upward or downward slides the scroll bar that may be located on the right side of the sensitive screen, the user may upward or downward slide content currently displayed on the screen; or when a user leftward or rightward slides the scroll bar that is located on the lower side of the sensitive screen, the user may leftward or rightward slide content currently displayed on the screen, which is easier for the user to browse the content displayed on the screen.

S902: Perform a sliding and browsing operation on content on the screen according to the sliding operation.

In another embodiment of the present invention, S902 specifically includes the following steps:

acquiring sliding information according to the sliding operation, where the sliding information includes a sliding speed and a sliding amplitude; and correspondingly performing the sliding and browsing operation on the content on the screen according to the sliding speed and the sliding amplitude.

Figure 11:
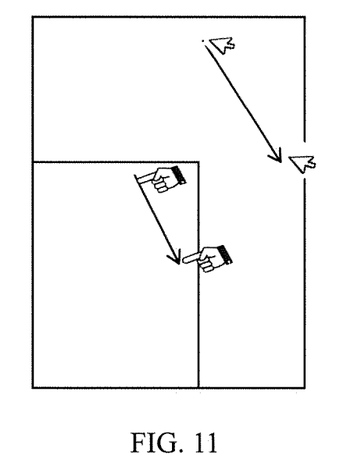
FIG. 11 is a schematic diagram of continuous movement of a cursor at corresponding positions on a screen, when an input track continuously slides on a sensitive screen, in a processing method according to an embodiment of the present invention.
Figure 12:
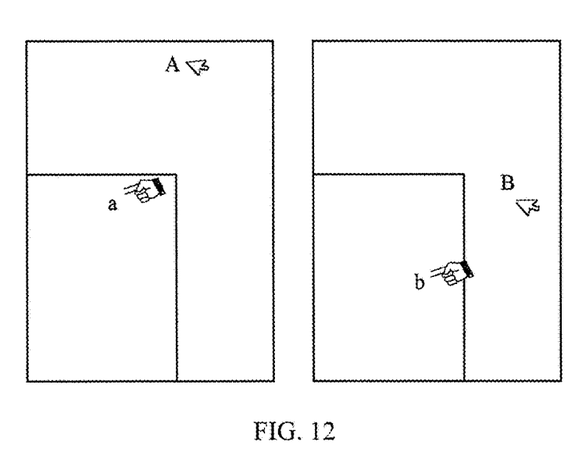
FIG. 12 is a schematic diagram of discontinuous movement of a cursor, when an input track does not continuously slide on a sensitive screen, in a processing method according to an embodiment of the present invention.

Another embodiment of the present invention further provides a processing method, where a difference between the method and the processing methods in the foregoing embodiments lies in that, after S102 in the processing methods in the foregoing embodiments, the method may further include the following steps:

if it is detected that an input track continuously slides on the sensitive screen, continuously moving the cursor to corresponding positions on the screen, as shown in FIG. 11; and if it is detected that an input track does not continuously slide on the sensitive screen, displaying the cursor at a display position, corresponding to the touch position, on the screen, where for example, when a user first taps a position a on the sensitive screen, then lifts the hand, and further taps a position b, the display position of the cursor on the screen changes from a position A that corresponds to a to a position B that corresponds to b, as shown in FIG. 12.

In the embodiments of the present invention, a sensing position on a sensitive screen of a screen is acquired; when a display position, corresponding to the acquired sensing position on the sensitive screen, on the screen is located in an operable area displayed on the screen, a touch button is displayed at the sensing position, corresponding to the operable area displayed on the screen, on the sensitive screen; and an operation is performed on the operable area by using an operation instruction for the touch button. Therefore, an operation can be performed with a single hand on content on a full screen of a terminal, which is easy to operate, and improves operation efficiency of a user. In addition, a fixed function menu is not required on a sensitive screen, thereby reducing an area of the sensitive screen.

Figure 13:
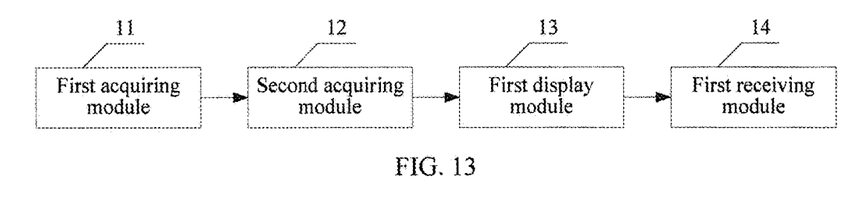
FIG. 13 is a schematic structural diagram of a processing apparatus according to an embodiment of the present invention.

Another embodiment of the present invention provides a processing apparatus. As shown in FIG. 13, the apparatus includes: a first acquiring module 11, a second acquiring module 12, a first display module 13, and a first receiving module 14.

The first acquiring module 11 is configured to acquire a sensing position on a sensitive screen of a screen.

In another embodiment of the present invention, the apparatus may further include a presetting module, configured to preset a position relationship between the sensitive screen and the screen.

The sensitive screen is a partial area of the screen and the sensitive screen is a central touch area of a terminal. A size of the sensitive screen may be set by a designer to a fixed value, or may be freely adjusted by a user; the sensitive screen may also be set by a designer to a fixed position, or a position may be freely adjusted by the user. For example, the sensitive screen may be located on the lower left or the lower right of the screen, or in a middle part of the screen. The sensitive screen is displayed in a transparent state. The sensing position on the sensitive screen may be a position, on the sensitive screen, touched by the user and induced by the sensitive screen, or may be a position, on the sensitive screen, corresponding to a gesture that is made by the user to the sensitive screen without touching the sensitive screen and that is induced by the sensitive screen.

The second acquiring module 12 is configured to acquire, according to the acquired sensing position on the sensitive screen and a preset correspondence between a sensing position on the sensitive screen and a display position on the screen, a display position, corresponding to the acquired sensing position on the sensitive screen, on the screen.

In another embodiment of the present invention, the apparatus may further include a second display module, configured to display a cursor at the display position.

In another embodiment of the present invention, the preset correspondence between a sensing position on the sensitive screen and a display position on the screen may be specifically: a length-width ratio of the sensitive screen is the same as a length-width ratio of the screen, and/or a relative position of the sensing position with respect to a boundary of the sensitive screen is the same as a relative position of the display position with respect to a boundary of the screen.

For example, as shown in FIG. 2, in another embodiment of the present invention, the sensitive screen is rectangular-shaped. By using borders of the screen as boundaries, a length-width ratio of the sensitive screen is the same as a length-width ratio of the screen. When a finger of a user touches the sensitive screen, a cursor 21 appears on the screen, and there is a one-to-one correspondence between a position at which the cursor appears on the screen and a position at which the finger of the user touches the sensitive screen. For example, when the user touches the center of the sensitive screen, the cursor appears in the center of the screen. When the cursor is located in an inoperable area of the screen, a form of the cursor is shown as the cursor 21 in FIG. 2.

In another embodiment of the present invention, the inoperable area refers to all areas on which an operation cannot be performed, such as an area that has no button, link, shortcut, or input box.

In another embodiment of the present invention, when the cursor is located in the inoperable area of the screen, if the sensitive screen receives no new input operation or instruction within a period of time, the cursor disappears; or when the cursor is located in the operable area of the screen, even if the sensitive screen receives no new input operation or instruction within a period of time, the cursor does not automatically disappear. Therefore, a situation in which the cursor located in the inoperable area of the screen occupies the screen for a long time is avoided, and a situation in which disappearance of the cursor located in the operable area of the screen causes that the user cannot conveniently determine whether the cursor is located in the operable area is also avoided.

The first display module 13 is configured to display, when the display position is located in an operable area displayed on the screen, a touch button at the sensing position, corresponding to the operable area displayed on the screen, on the sensitive screen.

In another embodiment of the present invention, the first display module 13 may be specifically configured to: when the cursor is located in the operable area displayed on the screen, display the touch button at the sensing position, corresponding to the operable area displayed on the screen, on the sensitive screen.

In another embodiment of the present invention, when the cursor is located in the operable area of the screen, a form of the cursor may be shown as a cursor 31 in FIG. 3, and a touch button 32 is displayed at a touch position, corresponding to the cursor, on the sensitive screen.

In another embodiment of the present invention, the operable area refers to all areas on which an operation can be performed, such as an area that has a button, a link, a shortcut, or an input box.

The first receiving module 14 is configured to receive an operation instruction for the touch button, where the operation instruction is used to instruct to perform an operation on the operable area.

As shown in FIG. 4, an operation process of a processing method provided by an embodiment of the present invention is as follows:

An input track continuously slides on a sensitive screen, and correspondingly, a cursor continuously moves to corresponding positions on a screen. When the cursor moves into an operable area, a touch button is displayed at a touch position, corresponding to the cursor, on the sensitive screen. A user needs to first stop touching the sensitive screen, and then manipulate the touch button. In this case, an operation performed on the touch button is equivalent to an operation directly performed by the user on the operable area on the screen, where the operation includes at least one of a single-tap operation, a double-tap operation, a touch and hold operation, and dragging after touch and hold.

Another embodiment of the present invention further provides a processing apparatus, where a difference between the apparatus and the processing apparatuses in the foregoing embodiments lies in that, the processing apparatus provided by the another embodiment of the present invention may further include:

a turn-on module, configured to turn on the sensitive screen.

In another embodiment of the present invention, the turn-on module is specifically configured to turn on the sensitive screen by using a preset physical button, where the physical button may be located on a side border or at the bottom or top of a terminal.

Alternatively, in another embodiment of the present invention, the turn-on module may specifically include:

a first detection module, configured to detect, by using the sensitive screen of the screen, a gesture made to the sensitive screen;

a first matching module, configured to perform matching according to the gesture, to obtain an operation command that corresponds to the gesture; and a turn-on submodule, configured to turn on the sensitive screen when the operation instruction is an instruction for turning on the sensitive screen.

In another embodiment of the present invention, the gesture may be preset. The gesture made to the sensitive screen may be a gesture made by a user by touching the sensitive screen and induced by the sensitive screen, or may be a gesture that is made by a user to the sensitive screen without touching the sensitive screen and that is induced by the sensitive screen. For example, the gesture may be set as a sliding gesture that uses any angle of the sensitive screen as a start angle and uses the start angle as a start point. As shown in FIG. 6, using that the sensitive screen is on the lower left of the screen as an example, a sliding gesture that uses a lower left corner of the sensitive screen, that is, a lower left corner of the screen as the start angle may be set as a gesture for turning on the sensitive screen.

In another embodiment of the present invention, the apparatus may further include:

a turn-off module, configured to turn off the sensitive screen.

In another embodiment of the present invention, the turn-off module is specifically configured to turn off the sensitive screen by using a preset physical button, where the physical button may be located on a side border or at the bottom or top of a terminal.

Alternatively, in another embodiment of the present invention, the turn-off module may specifically include:

a second detection module, configured to detect, by using the sensitive screen of the screen, a gesture made to the sensitive screen;

a second matching module, configured to perform matching according to the gesture, to obtain an operation command that corresponds to the gesture; and a turn-off submodule, configured to turn off the sensitive screen when the operation instruction is an instruction for turning off the sensitive screen.]

In another embodiment of the present invention, the gesture may be preset. The gesture made to the sensitive screen may be a gesture made by a user by touching the sensitive screen and induced by the sensitive screen, or may be a gesture that is made by a user to the sensitive screen without touching the sensitive screen and that is induced by the sensitive screen. For example, the gesture may be set as a sliding gesture that uses a centrosymmetric angle of a start angle of the sensitive screen as a start point. As shown in FIG. 8, using that the sensitive screen is on the lower left of the screen as an example, a sliding gesture that uses an upper right corner of the sensitive screen as the start point may be set as a gesture for turning off the sensitive screen.

Another embodiment of the present invention further provides a processing apparatus, where a difference between the apparatus and the processing apparatuses in the foregoing embodiments lies in that, the processing apparatus provided by the another embodiment of the present invention may further include a second receiving module and an operation module.

The second receiving module is configured to receive a sliding operation performed on a scroll bar by a user, where the scroll bar is a vertical and/or horizontal scroll bar displayed at an edge of the sensitive screen.

In another embodiment of the present invention, the vertical scroll bar includes a scroll block 91 and a scroll box 92, and the horizontal scroll bar includes a scroll block 93 and a scroll box 94. As shown in FIG. 10, a length of the scroll block indicates a position and a proportion of content on a current page of the screen in entire content. For example, when the length of the scroll block is only ⅕ of that of the entire scroll box and the scroll block is located in the middle part, it indicates that there are five screens of content in total, and that the content on the current page is located in the middle part of the entire content. The length of the scroll block is automatically adjusted according to content refreshing.

For example, the scroll bar may be located on a right side and a lower side of the sensitive screen. When a user upward or downward slides the scroll bar that may be located on the right side of the sensitive screen, the user may upward or downward slide content currently displayed on the screen; or when a user leftward or rightward slides the scroll bar that is located on the lower side of the sensitive screen, the user may leftward or rightward slide content currently displayed on the screen, which is easier for the user to browse the content displayed on the screen.

The operation module is configured to perform a sliding and browsing operation on content on the screen according to the sliding operation.

In another embodiment of the present invention, the operation module may specifically include:

a third acquiring module, configured to acquire sliding information according to the sliding operation, where the sliding information includes a sliding speed and a sliding amplitude; and an operation submodule, configured to correspondingly perform the sliding and browsing operation on the content on the screen according to the sliding speed and the sliding amplitude.

Another embodiment of the present invention further provides a processing apparatus, where a difference between the apparatus and the processing apparatuses in the foregoing embodiments lies in that, the processing apparatus provided by the another embodiment of the present invention may further include:

a movement module, configured to: if it is detected that an input track continuously slides on the sensitive screen, continuously move the cursor to corresponding positions on the screen, as shown in FIG. 11; and a third display module, configured to: if it is detected that a finger does not continuously slide on the sensitive screen, display the cursor at a display position, corresponding to the touch position, on the screen, where for example, when a user first taps a position a on the sensitive screen, then lifts the hand, and further taps a position b, the display position of the cursor on the screen changes from a position A that corresponds to a to a position B that corresponds to b, as shown in FIG. 12.

In the embodiments of the present invention, a sensing position on a sensitive screen of a screen is acquired; when a display position, corresponding to the acquired sensing position on the sensitive screen, on the screen is located in an operable area displayed on the screen, a touch button is displayed at the sensing position, corresponding to the operable area displayed on the screen, on the sensitive screen; and an operation is performed on the operable area by using an operation instruction for the touch button. Therefore, an operation can be performed with a single hand on content on a full screen of a terminal, which is easy to operate, and improves operation efficiency of a user. In addition, a fixed function menu is not required on a sensitive screen, thereby reducing an area of the sensitive screen.

Another embodiment of the present invention further provides a terminal including the foregoing described processing apparatus provided by the another embodiment of the present invention. The terminal is a touch screen terminal, and the terminal includes but is not limited to a mobile terminal.

Figure 14:
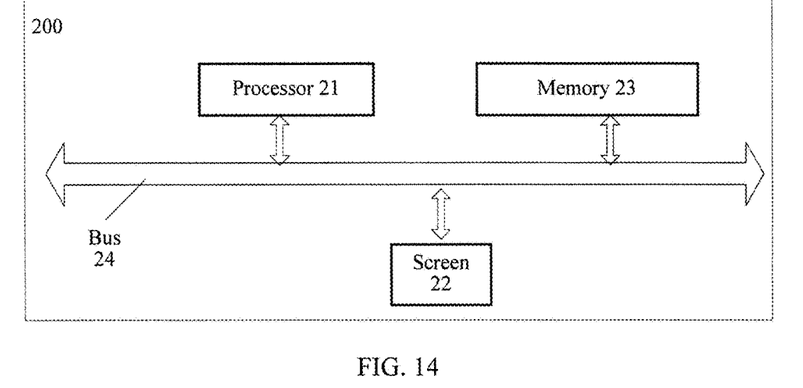
FIG. 14 is a schematic structural diagram of a terminal according to an embodiment of the present invention.

Another embodiment of the present invention further provides an apparatus embodiment for implementing the steps and methods in the foregoing method embodiments. The another embodiment of the present invention may be applied to a terminal, where the terminal is a touch screen terminal, and the terminal includes but is not limited to a mobile terminal. FIG. 14 shows an embodiment of a terminal. In this embodiment, the terminal 200 includes:

a processor (processor) 21, a screen 22, a memory (memory) 23, and a bus 24.

The methods disclosed in the foregoing embodiments of the present invention may be applied to the processor 21, in other words, may be implemented by the processor 21. The processor 21 controls an operation of the terminal 200. The processor 21 may be an integrated circuit chip and has a signal processing capacity. In an implementation process, the steps of the foregoing methods may be completed by using an integrated logic circuit of hardware in the processor 21 or an instruction in a software form. The processor 21 may be a central processing unit (central processing unit, CPU), a digital signal processor (DSP), an application-specific integrated circuit (ASIC), a field programmable gate array (FPGA) or another programmable logic device, a discrete gate or transistor logic device, or a discrete hardware component, and is configured to execute the methods disclosed in the embodiments of the present invention. The methods, steps and logic block diagrams disclosed in the embodiments of the present invention can be implemented or executed. With reference to the embodiments of the present invention, the steps of the methods disclosed in the embodiments of the present invention may be directly completed by the hardware processor 21 or completed by a combination of hardware and software in the processor 21. The software may be located in a storage medium mature in the art, such as a random access memory, a flash memory, a read-only memory, a programmable read-only memory, an electrically erasable programmable memory, or a register. The storage medium is located in the memory 23. The processor 21 reads information in the memory 23, and performs the steps of the foregoing methods in combination with the hardware thereof.

The screen 22 refers to a screen having an input function and an output and display function, where the screen includes a sensitive screen. The sensitive screen is a partial area of the screen and the sensitive screen is a central touch area of a terminal. A size of the sensitive screen may be set by a designer to a fixed value, or may be freely adjusted by a user; the sensitive screen may also be set by a designer to a fixed position, or a position may be freely adjusted by the user. For example, the sensitive screen may be located on the lower left or the lower right of the screen, or in a middle part of the screen. The sensitive screen is displayed in a transparent state. A sensing position on the sensitive screen may be a position, on the sensitive screen, touched by the user and induced by the sensitive screen, or may be a position, on the sensitive screen, corresponding to a gesture that is made by the user to the sensitive screen without touching the sensitive screen and that is induced by the sensitive screen.

The memory 23 may include a read-only memory and a random access memory, and provide an instruction and data to the processor 21. A part of the memory 23 may further include a non-volatile random access memory (NVRAM). The memory 23 stores the following data: the software executed by the processor 21, a preset position relationship between the sensitive screen and the screen, a preset correspondence between a sensing position on the sensitive screen and a display position on the screen, and a preset correspondence between a gesture and an operation command. In another embodiment of the present invention, the preset correspondence between a sensing position on the sensitive screen and a display position on the screen may be specifically: a length-width ratio of the sensitive screen is the same as a length-width ratio of the screen, and/or a relative position of the sensing position with respect to a boundary of the sensitive screen is the same as a relative position of the display position with respect to a boundary of the screen.

Components of the terminal 200 are coupled together by using the bus 24, where the bus 24 not only includes a data bus but also includes a power bus, a control bus, and a state signal bus. However, for clear description, various buses are marked as the bus 24 in the figure.

A person of ordinary skill in the art may understand that all or some of the steps of the methods in the embodiments may be implemented by a program instructing relevant hardware. The program may be stored in a computer readable storage medium, such as a ROM/RAM, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A terminal, wherein the terminal comprises:
a processor, a screen, a memory, and a bus, wherein the processor, the screen, and the memory are coupled together by using the bus;
wherein the processor is configured to control operation of the terminal to: acquire a sensing position on a sensitive screen of a screen,
acquire, according to the acquired sensing position on the sensitive screen and a preset correspondence between a sensing position on the sensitive screen and a display position on the screen, a display position, corresponding to the acquired sensing position on the sensitive screen, on the screen,
display, when the display position is located in an operable area displayed on the screen, a touch button at the sensing position, corresponding to the operable area displayed on the screen, on the sensitive screen,
receive an operation instruction for the touch button, wherein the operation instruction is used to instruct to perform an operation on the operable area;
wherein the screen is a screen having an input function and an output and display function, and the screen comprises a sensitive screen; and
wherein the memory stores software executed by the processor and provides an instruction and data to the processor.

2. A processing apparatus, wherein the apparatus comprises:
a first acquiring module, configured to acquire a sensing position on a sensitive screen of a screen;
a second acquiring module, configured to acquire, according to the acquired sensing position on the sensitive screen and a preset correspondence between a sensing position on the sensitive screen and a display position on the screen, a display position, corresponding to the acquired sensing position on the sensitive screen, on the screen;
a first display module, configured to display, when the display position is located in an operable area displayed on the screen, a touch button at the sensing position, corresponding to the operable area displayed on the screen, on the sensitive screen; and
a first receiving module, configured to receive an operation instruction for the touch button, wherein the operation instruction is used to instruct to perform an operation on the operable area.

3. The apparatus according to claim 2, wherein the apparatus further comprises:
a second display module, configured to display a cursor at the display position; and
the first display module is configured to:
when the cursor is located in the operable area displayed on the screen, display the touch button at the sensing position, corresponding to the operable area displayed on the screen, on the sensitive screen.

4. The apparatus according to claim 2, wherein the preset correspondence between a sensing position on the sensitive screen and a display position on the screen comprises:
a length-width ratio of the sensitive screen is the same as a length-width ratio of the screen, and/or a relative position of the sensing position with respect to a boundary of the sensitive screen is the same as a relative position of the display position with respect to a boundary of the screen.

5. The apparatus according to claim 2, wherein the apparatus further comprises:
a presetting module, configured to preset a position relationship between the sensitive screen and the screen.

6. The apparatus according to claim 2, wherein the apparatus further comprises:
a turn-on module, configured to turn on the sensitive screen, wherein:
the turn-on module is configured to turn on the sensitive screen by using a preset physical button; or
the turn-on module comprises:
a first detection module, configured to detect, by using the sensitive screen of the screen, a gesture made to the sensitive screen,
a first matching module, configured to perform matching according to the gesture, to obtain an operation command that corresponds to the gesture, and
a turn-on submodule, configured to turn on the sensitive screen when the operation instruction is an instruction for turning on the sensitive screen.

7. The apparatus according to claim 2, wherein the apparatus further comprises:
a turn-off module, configured to turn off the sensitive screen, wherein:
the turn-off module is configured to turn off the sensitive screen by using a preset physical button; or
the turn-off module comprises:
a second detection module, configured to detect, by using the sensitive screen of the screen, a gesture made to the sensitive screen,
a second matching module, configured to perform matching according to the gesture, to obtain an operation command that corresponds to the gesture, and
a turn-off submodule, configured to turn off the sensitive screen when the operation instruction is an instruction for turning off the sensitive screen.

8. The apparatus according to claim 2, wherein the apparatus further comprises:
a second receiving module, configured to receive a sliding operation performed on a scroll bar by a user, wherein the scroll bar is a vertical and/or horizontal scroll bar displayed at an edge of the sensitive screen; and
an operation module, configured to perform a sliding and browsing operation on content on the screen according to the sliding operation.

9. The apparatus according to claim 2, wherein the sensitive screen is a partial area of the screen for user's input.

10. A terminal, wherein the terminal comprises:
a screen, configured to acquire a sensing position on a sensitive screen of a screen;
a processor, configured to:
acquire, according to the acquired sensing position on the sensitive screen and a preset correspondence between a sensing position on the sensitive screen and a display position on the screen, a display position, corresponding to the acquired sensing position on the sensitive screen, on the screen, and instruct the screen to display, when the display position is located in an operable area displayed on the screen, a touch button at the sensing position, corresponding to the operable area displayed on the screen, on the sensitive screen; and wherein the screen is configured to receive an operation instruction for the touch button, wherein the operation instruction is used to instruct to perform an operation on the operable area.

11. The terminal according to claim 10, wherein the screen is further configured to:

display a cursor at the display position; and when the cursor is located in the operable area displayed on the screen, display the touch button at the sensing position, corresponding to the operable area displayed on the screen, on the sensitive screen.

12. The terminal according to claim 10, wherein the processor is further configured to preset a position relationship between the sensitive screen and the screen.

13. The terminal according to claim 10, wherein the terminal further comprises:

a memory, configured to store software executed by the processor, and provide an instruction and data to the processor.

14. The terminal according to claim 10, wherein the sensitive screen is a partial area of the screen for user's touch.

15. A processing method, wherein the method comprises:

acquiring a sensing position on a sensitive screen of a screen;

acquiring, according to the acquired sensing position on the sensitive screen and a preset correspondence between a sensing position on the sensitive screen and a display position on the screen, a display position, corresponding to the acquired sensing position on the sensitive screen, on the screen;

displaying, when the display position is located in an operable area displayed on the screen, a touch button at the sensing position, corresponding to the operable area displayed on the screen, on the sensitive screen; and receiving an operation instruction for the touch button, wherein the operation instruction is used to instruct to perform an operation on the operable area.

16. The method according to claim 15, wherein:

after acquiring the display position on the screen, the method further comprises:

displaying a cursor at the display position; and displaying the touch button at the sensing position comprises:

when the cursor is located in the operable area displayed on the screen, displaying the touch button at the sensing position, corresponding to the operable area displayed on the screen, on the sensitive screen.

17. The method according to claim 15, wherein the preset correspondence between a sensing position on the sensitive screen and a display position on the screen comprises: a length-width ratio of the sensitive screen is the same as a length-width ratio of the screen, and/or a relative position of the sensing position with respect to a boundary of the sensitive screen is the same as a relative position of the display position with respect to a boundary of the screen.

18. The method according to claim 15, wherein before acquiring the sensing position on the sensitive screen of the screen, the method further comprises:

presetting a position relationship between the sensitive screen and the screen.

19. The method according to claim 15, wherein before acquiring the sensing position on the sensitive screen of the screen, the method further comprises:

turning on the sensitive screen, wherein:

turning on the sensitive screen comprises turning on the sensitive screen by using a preset physical button; or turning on the sensitive screen comprises:

detecting, by using the sensitive screen of the screen, a gesture made to the sensitive screen, performing matching according to the gesture, to obtain an operation command that corresponds to the gesture, and turning on the sensitive screen when the operation instruction is an instruction for turning on the sensitive screen.

20. The method according to claim 15, wherein the method further comprises:

turning off the sensitive screen, wherein turning off the sensitive screen comprises turning off the sensitive screen by using a preset physical button; or turning off the sensitive screen comprises:

detecting, by using the sensitive screen of the screen, a gesture made to the sensitive screen, performing matching according to the gesture, to obtain an operation command that corresponds to the gesture, and turning off the sensitive screen when the operation instruction is an instruction for turning off the sensitive screen.

21. The method according to claim 15, wherein the method further comprises:

receiving a sliding operation performed on a scroll bar by a user, wherein the scroll bar is a vertical and/or horizontal scroll bar displayed at an edge of the sensitive screen; and performing a sliding and browsing operation on content on the screen according to the sliding operation.

22. The method according to claim 1, wherein the sensitive screen is a partial area of the screen for user's input.

* * * * *